000
UNITED STATES PATENT OFFICE.

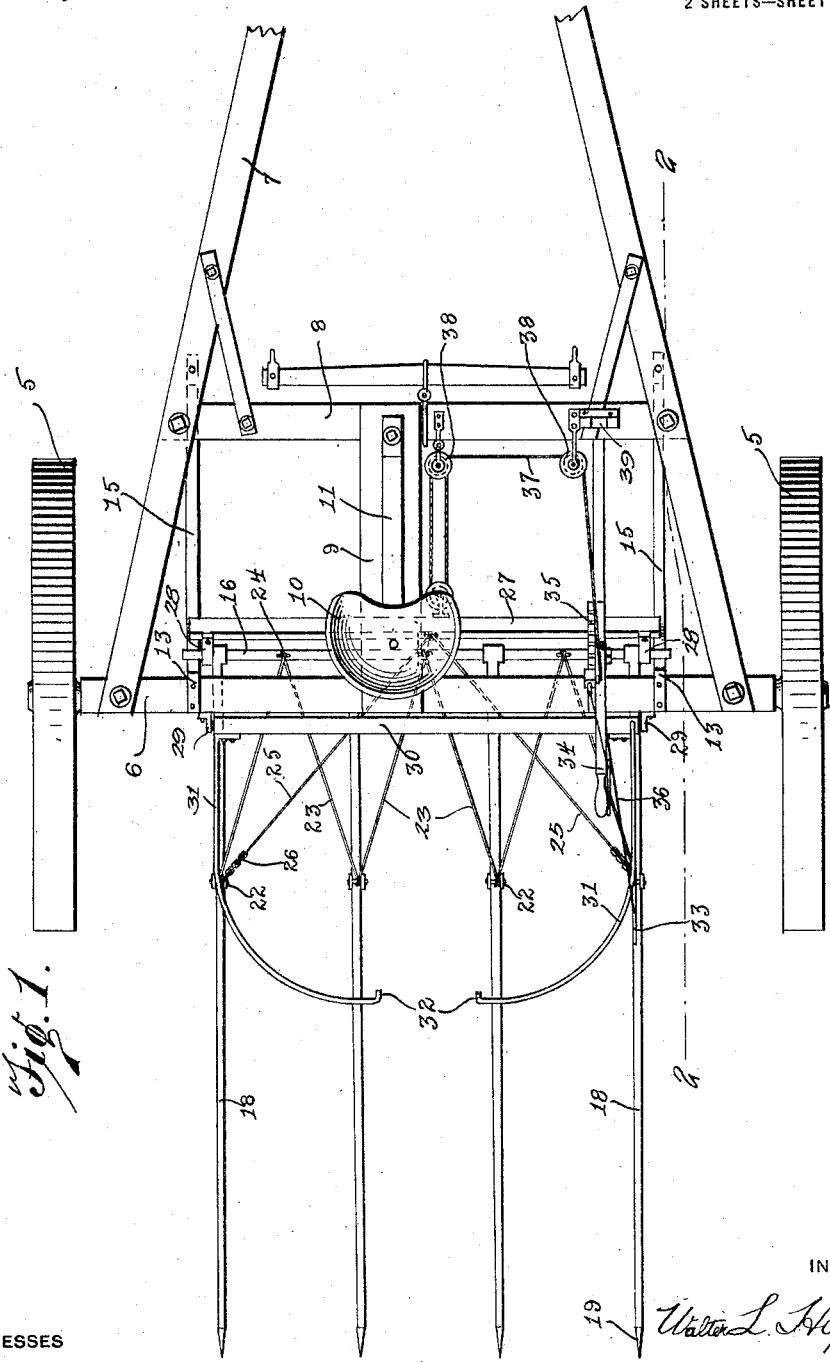

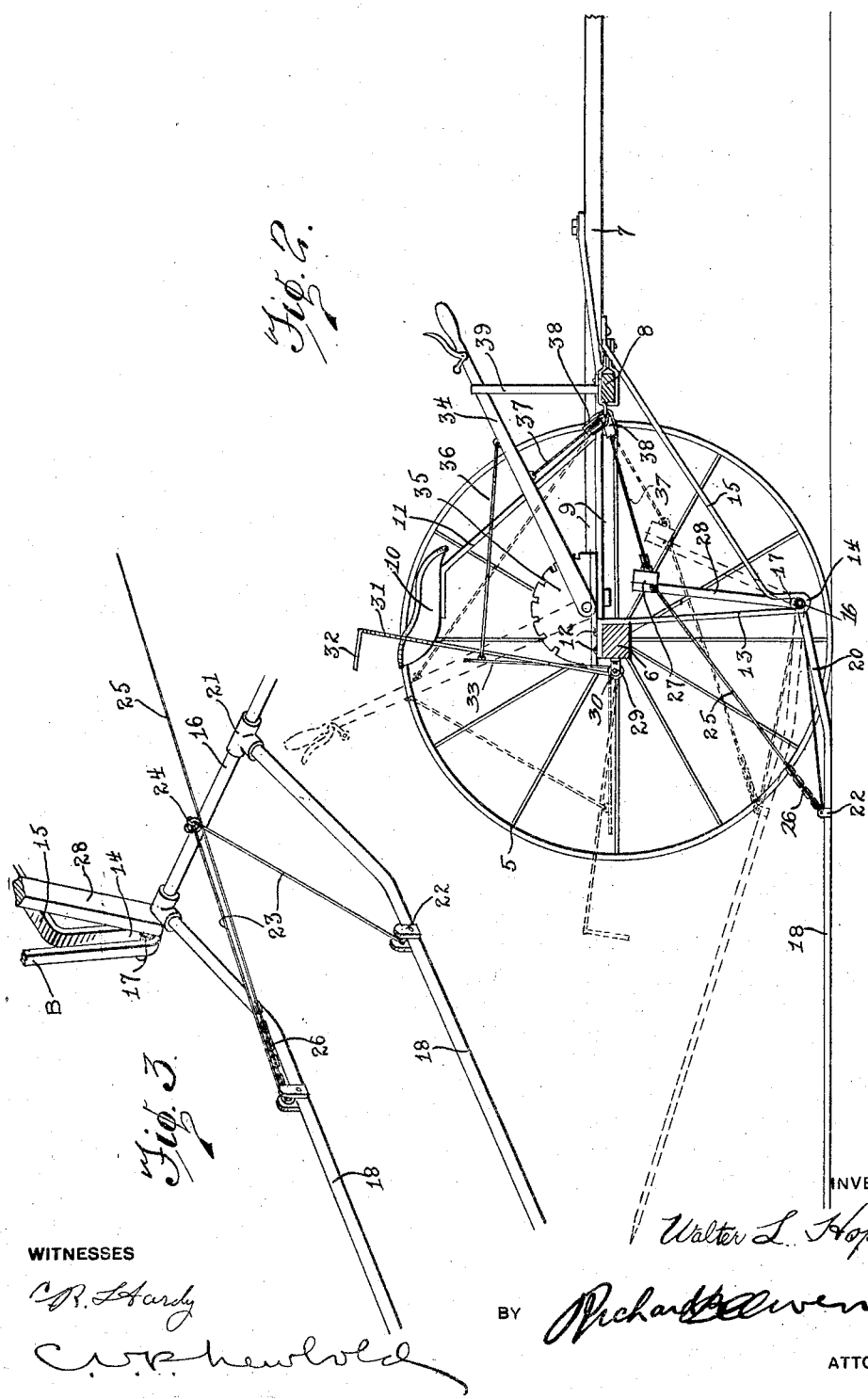

WALTER L. HOPKINS, OF SUTTON, WEST VIRGINIA.

TRANSPORTING-VEHICLE FOR GRAIN-SHOCKS.

1,276,064.

Specification of Letters Patent.

Patented Aug. 20, 1918.

Application filed August 6, 1915. Serial No. 44,086.

*To all whom it may concern:*

Be it known that I, WALTER L. HOPKINS, a citizen of the United States, residing at Sutton, in the county of Braxton and State of West Virginia, have invented certain new and useful Improvements in Transporting-Vehicles for Grain-Shocks, of which the following is a specification.

This invention relates to agricultural vehicles, or machines of that type employed to convey grain shocks from the field to the place of storage.

As a particular object, it is contemplated by this invention to provide a transporting vehicle which shall be capable of being quickly and easily loaded with a hay shock, or a similar grain mass for removal for the place of loading.

More specifically it is an object of this invention to provide a vehicle of the type mentioned which shall include a carrier frame adapted to be revolved to a position upon the ground in order to facilitate the loading of the frame, to provide means for engaging and holding the top of the grain shock when placed upon the carrier frame and finally to provide a single lever for the operation of both the carrier frame and the holding means to simultaneously move them to a loading or unloading position.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:

Figure 1 is a plan view of the transport vehicle provided by this invention;

Fig. 2 is a sectional elevation of the vehicle taken on the line 2—2 of Fig. 1, and Fig. 3 is a perspective detail of one corner of the carrier frame, showing the support and control means therefor.

In the production of the transport vehicle of the present invention, there is employed a wheeled frame of the customary character comprising the wheels 5 which are rotatably supported at the extremities of the axle 6 to which is connected the ordinary running gear of a single truck vehicle including the hounds 7, the latter being connected by a brace 8 forward of the axle. A platform brace 9 is supported by the axle 6 and the brace 8 and in its turn serves to support the driver's seat 10 through the medium of a standard 11 and secured near each end of the axle 6 by means 12 is a bracket strap 13 which straps are formed at their lower extremities, a short distance from the ground, with bight portions 14 continuing thence in the form of integral forwardly oblique connections 15 to the hounds 7.

Having its extremities supported in the alined loops or bights 14 of the pair of bracket straps 13 is a shaft 16 which is preferably formed of hollow piping for the acquired strength and lightness. Washers 17 are removably carried by this shaft at the extremities thereof adjacent the inner sides of the loops 14 in order to prevent any lateral displacement of the shaft with respect to the brackets. This shaft forms the pivoting axis for the carrier frame, which latter includes a number of rearwardly extending prongs 18 also formed from piping and having their extremities welded into points 19. These prongs are adapted to contact directly with the ground in the loading position of the vehicle as is illustrated to advantage in Fig. 2 and have their forward extremities curved upwardly, as denoted by the numeral 20, to make suitable elbow or T-joint connections 21 with the shaft 16. Clips 22 are carried upon each of these prongs 18 through the medium of suitable securing bolts, such clips affording fastening points for braces 23 which extend forwardly to the shaft 16 and are there secured in the manner shown at 24. Lifting rods 25 are connected by some such flexible means as the chains 26 with the clips of the laterally outermost prongs 18 and extend forwardly to a central beam 27 which is supported at the upper extremities of a pair of bars 28 secured to the ends of the shaft 16 in the manner shown in Fig. 3.

Extending rearwardly from the axle 6 are a pair of spaced ears 29 in which are rotatably journaled the reduced extremities or trunnions formed upon the oscillatable shaft 30. This latter shaft carries a holding means for the top of the shock loaded upon the carrier frame, such means including rearwardly extending fingers 31 which are bent to approach each other and each formed with mutually spaced downwardly turned extremities 32. The shaft 30 carries at one end a lever extension 33 for the operation thereof, the operating means also simultaneously moving the carrier frame into or out of its loading position.

The operating means mentioned includes a lever 34 which is associated in the customary manner with a locking segment 35, the latter being mounted upon the axle of the vehicle. Rigid connections such as the rods 36 extend between this lever and the lever extensions 33 for the obvious operation of the shaft 30. Flexible connections 37 also extend between this lever and the beam 27 of the carrier frame, such motion being over suitable pulleys 38 which may be supported upon the cross brace 8 connecting the hounds. A fork 39 also carried on this brace serves to support the lever when moved to its forward position, that of loading.

The shock to be transported from the field by the vehicle of this invention may be readily moved over upon the prongs 18 of the carrier frame, since these latter lie upon the ground, when the lever 34 is in its forward position. It should be noted that the holding fingers 31 are drawn into a substantially vertical position while the shock is being loaded, in order not to interfere with this operation. When the shock has been completely placed upon the carrier frame, the lever 34 is moved through its rearward arc and locked in the dotted line position of Fig. 2. This movement will elevate the prongs of the carrier frame through the pull of the connection 37 and will also cause the top of the shock to be firmly gripped by the prongs 32 of the holding fingers 31, as these latter are moved into their substantially horizontal position. The shock may then be transported to its destination with the carrier frame easily clearing the ground and the shock held so securely by the fingers 31 that no opportunity is presented for displacement of the shock from the frame. Unloading is easily accomplished by unlocking the lever 34 and permitting it to move forward to rest in the fork 39, this same movement disengaging the top holder and allowing the shock to be readily rolled off the carrier frame to the adjacent ground.

While in the foregoing, however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. A transporting vehicle including a plurality of rearwardly extending parallel fingers for carrying grain shocks, a rocking shaft to which said fingers are connected and by means of which they are adapted to be raised and lowered, an arm projecting upwardly from each end of said shaft and fixed thereto, a cross bar connected to the upper ends of said arms, brace rods connected to said fingers and diverging therefrom to the shaft and fastened thereto, lifting rods extending between the outermost fingers and said cross bar, a rocking lever, and a flexible connection between said rocking lever and said cross bar to raise and lower the grain carrying fingers.

2. A transporting vehicle including a plurality of rearwardly extending parallel fingers for carrying grain shocks, a rocking shaft to which said fingers are connected and by means of which they are adapted to be raised and lowered, an arm projecting upwardly from each end of said shaft and fixed thereto, a cross bar connected to the upper ends of said arms, brace rods connected to said fingers and diverging therefrom toward the shaft and fastened thereto, said rods holding the fingers from lateral movement, lifting rods connected to said cross bar extending outwardly and rearwardly toward the outermost fingers, a flexible section connecting the rear ends of said rods with the fingers, holding fingers above and adapted to coöperate with the first named fingers to hold the grain shocks in place, a cross shaft to which said fingers are attached, an arm projecting upwardly from said cross shaft, a hand lever pivoted to the vehicle, means connecting said hand lever to said cross bar for raising and lowering the grain carrying fingers, and other means connecting the hand lever to the coöperating holding fingers to move them toward and from the first named fingers.

In testimony whereof I affix my signature in presence of two witnesses.

WALTER L. HOPKINS.

Witnesses:
 DELTA BENDER,
 ERNEST L. CURRENCE.

Copies of this patent may be obtained for five cents each, by addressing the "Commissioner of Patents, Washington, D. C."